(12) United States Patent
Bates et al.

(10) Patent No.: US 7,577,942 B2
(45) Date of Patent: Aug. 18, 2009

(54) EFFICIENT MONITORING OF PROGRAM VARIABLES UNDER DEBUG

(75) Inventors: Cary Lee Bates, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1535 days.

(21) Appl. No.: 09/915,509

(22) Filed: Jul. 26, 2001

(65) Prior Publication Data

US 2003/0023955 A1    Jan. 30, 2003

(51) Int. Cl.
G06F 9/44    (2006.01)
(52) U.S. Cl. .................. 717/129; 717/125; 717/126; 717/131; 717/132; 717/133
(58) Field of Classification Search ......... 717/124–133, 717/144; 714/43
See application file for complete search history.

(56) References Cited

U.S. PATENT DOCUMENTS

| | | | | |
|---|---|---|---|---|
| 5,191,646 A * | 3/1993 | Naito et al. | ............... | 345/853 |
| 5,446,900 A * | 8/1995 | Kimelman | ............... | 717/124 |
| 5,555,412 A * | 9/1996 | Besaw et al. | ............... | 717/144 |
| 5,870,607 A * | 2/1999 | Netzer | ............... | 717/127 |
| 5,881,288 A * | 3/1999 | Sumi et al. | ............... | 717/125 |
| 6,295,613 B1 * | 9/2001 | Bates et al. | ............... | 714/43 |
| 6,324,683 B1 * | 11/2001 | Fuh et al. | ............... | 717/124 |
| 6,493,868 B1 * | 12/2002 | DaSilva et al. | ............... | 717/105 |
| 6,550,056 B1 * | 4/2003 | Mizumoto et al. | ............... | 717/124 |
| 6,678,884 B1 * | 1/2004 | Kesselman et al. | ............... | 717/129 |
| 6,948,164 B2 * | 9/2005 | Tinker | ............... | 717/168 |
| 7,047,526 B1 * | 5/2006 | Wheeler et al. | ............... | 717/143 |
| 2001/0004766 A1 * | 6/2001 | Koyama | ............... | 717/4 |
| 2002/0073398 A1 * | 6/2002 | Tinker | ............... | 717/110 |

OTHER PUBLICATIONS

Miller, Barton P.; "A Mechanism for Efficient Debugging of Parallel Program"; SIGPLAN 1988; pp. 141-150.*
Agrawal et al.; "Debugging with Dynamic Slicing and Backtracking"; John Wiley and Sons, Ltd., Software—Practice and Experience, vol. 23, 1993; pp. 589-616.*
Horwitz et al.; "Interprocedural Slicing Using Dependence Graphs"; ACM, 1990; pp. 26-60.*
Ferrante et al.; "The Program Dependence Graph and Its Use in Optimization"; ACM 1987; pp. 319-349.*

(Continued)

*Primary Examiner*—Insun Kang
(74) *Attorney, Agent, or Firm*—Patterson & Sheridan, LLP

(57) ABSTRACT

Method, system and article of manufacture for monitoring variables. In one embodiment, information generated by a compiler is used to determine which variables need to be updated when performing a step, a "run to cursor" operation, and when a breakpoint is hit. This may be accomplished by providing as debugger data which variables may be affected at each statement of a program and a control flow graph for the program or procedure. The information about which variables may be affected can be stored as individual variables or sets of variables. When execution of the program being debugged is halted, only those variables whose values may have changed are refreshed in a variables window of a user interface.

20 Claims, 11 Drawing Sheets

OTHER PUBLICATIONS

DeMillo et al.; "An Execution Backtracking Approach to Program Debugging"; Technical Report SERC-TR-22-P, Software Engineering Research Center, Purdue University, 1991; pp. 1-18.*

Pang et al.; "Constraint-Directed Backtracking Algorithm for Constraint-Satisfaction Problems"; Technical Report CS-96-05, Department of Computer Science, University of Regina, 1996; pp. 1-11.*

Tip, Frank; "A Survey of Program Slicing Techniques"; CWI, P.O. Box 94079, 1090 GB Amsterdam, The Netherlands; pp. 1-58.*

"Turbo C++, User's Guide"; Borland International Inc.; 1992; pp. 217-250.*

* cited by examiner

EFFICIENT MONITORING OF PROGRAM VARIABLES UNDER DEBUG

BACKGROUND OF THE INVENTION

1. Field of the Invention

The present invention generally relates to data processing. More particularly, embodiments are provided for monitoring variables of a program being debugged.

2. Description of the Related Art

Inherent in any software development technique is the potential for introducing "bugs". A bug will typically cause unexpected results during the execution of the program. Locating, analyzing, and correcting bugs in a computer program is a process known as "debugging." Debugging of programs may be done either manually or interactively by a debugging system mediated by a computer system. Manual debugging of a program requires a programmer to manually trace the logic flow of the program and the contents of memory elements, e.g., registers and variables. In the interactive debugging of programs, the program is executed under the control of a monitor program (known as a "debugger"). The debugger may be located on and executed by the same computer system on which the program is executed or may be located on a different system from the one the program is executed on, in the case of a distributed debugger.

Conventional debuggers typically support various operations to assist a computer programmer. Each operation allows the programmer to examine the state of program registers and variables at a given point in the execution of a program. A first operation supported by conventional debuggers is a breakpoint operation. A "breakpoint" is a point in the program where execution of the computer program is stopped so that the state of the program can be examined by a computer programmer. As a result, when a computer program is executed by a debugger, the program executes in a normal fashion until a breakpoint is reached. The debugger then stops execution and displays the results of the computer program to the programmer for analysis.

Most breakpoints supported by conventional debuggers are unconditional, meaning that once such a breakpoint is reached, execution of the program is always halted. Some debuggers also support the use of conditional breakpoints, which only halt execution of a program when a variable used by the program is set to a predetermined value at the time such a breakpoint is reached.

A second operation supported by conventional debuggers is a "step" function. Step functions known in the art include "step through" (also known as "step into") and "step over" (also known as "next" and "skip") operations. Step functions permit a computer programmer to process instructions in a computer program at a source file level (i.e., line by line) and at a statement level, and see the results upon completion of each instruction.

Another operation commonly used by programmers debugging code is known as a "run to" operation. "Run to" operations allow a user to execute code until reaching a predetermined point. For example, a first "Run to" operation makes it possible to skip directly to the end of a procedure from a current position in the procedure. A second "run to" operation allows a programmer to determine where execution will be halted according to placement of a cursor.

Typically, step operations, breakpoints and "run to" operations are used together to simplify the debugging process. Specifically, a common debugging operation is to set a breakpoint at the beginning of a desired set of instructions to be analyzed, and then execute the program. Once the breakpoint is reached, the program is halted, and the programmer then steps through the desired set of instructions line by line or statement by statement using the step operation. Alternatively, the programmer may advance to subsequent points in code space using "run to" operations. Consequently, a programmer is able to isolate and analyze a particular set of instructions without having to step through irrelevant portions of a computer program.

One of the primary features of graphical debuggers are windows that contain variables whose values are updated at each and every debugger stop so that a user may see the current value of the variable. Such windows may include a local variables window where all the names and values of the variables that are local to the current procedure are displayed, a monitor window that lists variable names and their values for particular variables selected by the user, and a call stack window.

One problem with such variables windows is that each time the user performs a step, a "run to cursor" or hits a breakpoint, the values of all the variables in these windows must be refreshed. As a result, the system throughput is negatively affected due to the overhead associated with retrieving and displaying the variable values. Particularly in the case of a distributed debugger, this contributes to a substantial performance problem because the data is transported over a communication mechanism, such as a socket.

Therefore, a more efficient variable monitoring method is needed.

SUMMARY OF THE INVENTION

The present invention generally provides embodiments for monitoring variables. By monitoring the variables it can be determined which variables need to be updated when displaying the variables.

One embodiment provides a method of determining variables to update in a debugging environment. The method comprises executing at least one of a first task when a run command is received and a second task when a set step command for a statement is received. The first task comprises determining a first kill variables set comprising only those variables which may be affected by the execution of a program from a particular point of the program to a breakpoint that can be encountered during execution of the program from the particular point. The second task comprises determining a second kill variables set comprising only those variables which may be affected by execution of the statement.

Another embodiment provides a computer readable medium containing a program which, when executed by a processor, performs operations for determining variables to update in a debugging environment, the operations comprising executing at least one of a first task when a run command is received and a second task when a set step command for a statement is received. The first task comprises determining a first kill variables set comprising only those variables which may be affected by the execution of a program from a particular point of the program to a breakpoint that can be encountered during execution of the program from the particular point. The second task comprises determining a second kill variables set comprising only those variables which may be affected by execution of the statement.

Yet another embodiment provides a computer readable medium containing a program which, when executed by a processor, performs operations for determining variables to update in a debugging environment. The operations comprise executing a task when a run command is received, wherein the task comprises determining a kill variables set comprising only those variables which may be affected by the execution of a program from, and including, a particular statement of the program to a breakpoint that can be encountered during execution of the program from the particular point. If the task has completed execution when the breakpoint is encountered during execution of the program, only the variables contained in the kill variables set are updated on a user interface.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
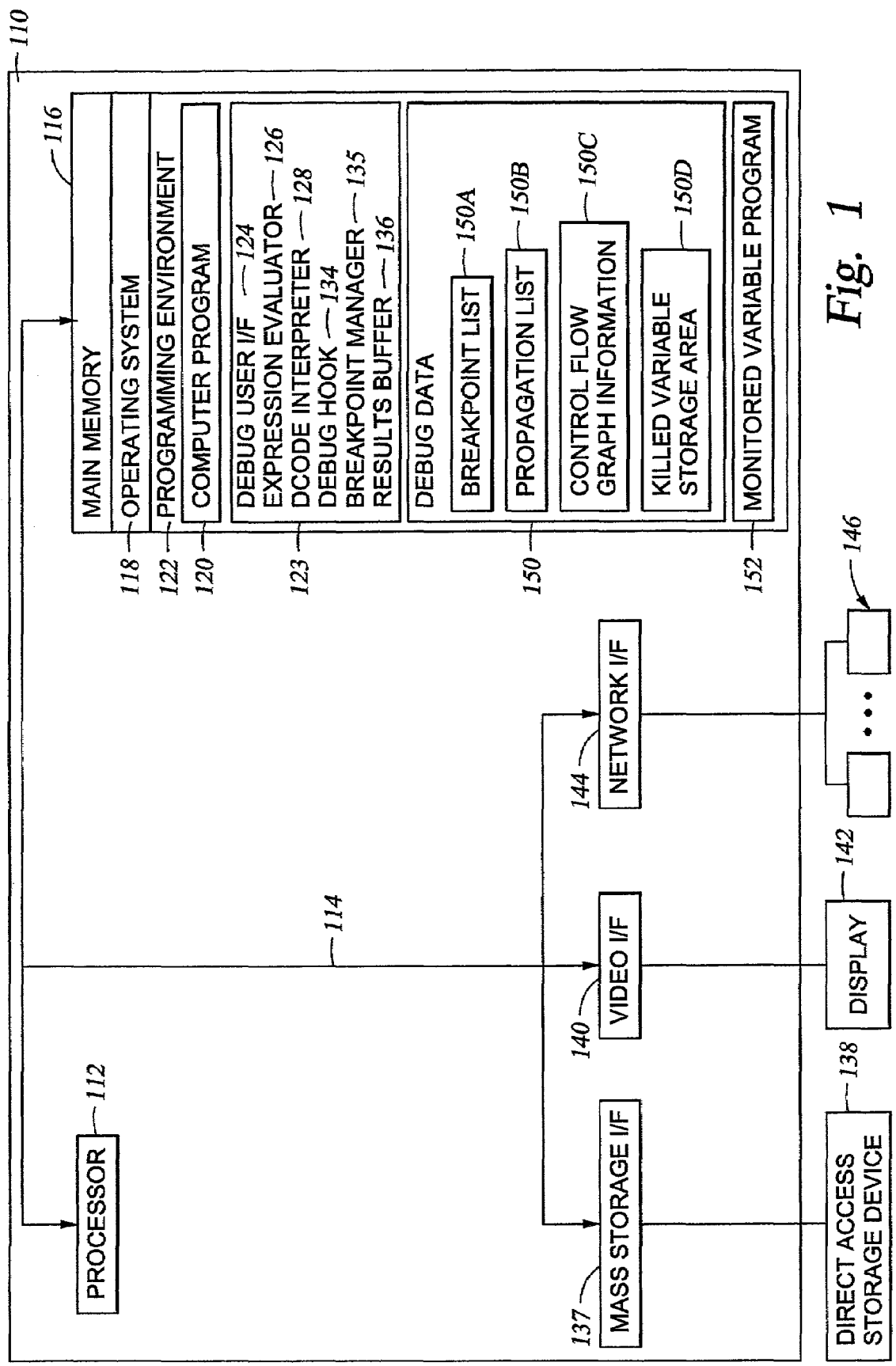
FIG. 1 is a high-level diagram of a computer system.

The present invention provides embodiments for monitoring variables. In one embodiment, information generated by a compiler is used to determine which variables need to be updated when performing a step, a "run to cursor" operation, and when a breakpoint is hit. This may be accomplished by providing, as debugger data, which variables may be affected at each statement of a program and a control flow graph for the program or procedure. The information about which variables may be affected can be stored as individual variables or sets of variables. Variables whose value may be changed are referred to herein as "killed variables" or "kill variables".

In the case of a step operation, a debugger identifies which variables may be affected by the statement just stepped over and, once the step has completed, requests only those values. In the case where the debugger is running remotely on another system, this processing can be done in parallel to the step operation. In addition to examining the statement for variables to update, the debugger may also only refresh a call stack window if the statement contains a call.

In the case of a "run to cursor" operation or when a program is allowed to run to the next breakpoint, a dataflow algorithm using a control flow graph is implemented. Using the current stopped position, the dataflow algorithm determines for each breakpoint which variables may be affected if control reaches that particular breakpoint. When the program control then reaches a breakpoint, the debugger refers to the information just computed for the particular breakpoint reached to determine exactly which variable values must be requested/refreshed.

One embodiment of the invention is implemented as a program product for use with a computer system such as, for example, the computer system 110 shown in FIG. 1 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Moreover, those skilled in the art will appreciate that embodiments may be practiced with other computer system configurations including hand-held devices, multiprocessor systems, microprocessor-based or programmable consumer electronics, minicomputers, mainframe computers and the like. The embodiments may also be practiced in distributed computing environments where tasks are performed by remote processing devices that are linked through a communications network. In a distributed computing environment, program modules may be located in both local and remote memory storage devices.

Referring now to FIG. 1, a computer system 110 consistent with the invention is shown. For purposes of the invention, computer system 110 may represent any type of computer, computer system or other programmable electronic device, including a client computer, a server computer, a portable computer, an embedded controller, etc. The computer system 110 may be a standalone device or networked into a larger system. In one embodiment, the computer system 110 is an eServer iSeries 400 computer available from International Business Machines of Armonk, N.Y.

The computer system 110 could include a number of operators and peripheral systems as shown, for example, by a mass storage interface 137 operably connected to a direct access storage device 138, by a video interface 140 operably connected to a display 142, and by a network interface 144 operably connected to a plurality of networked devices 146. The display 142 may be any video output device for outputting a user interface. The networked devices 146 could be desktop or PC-based computers, workstations, network terminals, or other networked computer systems.

Computer system 110 is shown for a programming environment that includes at least one processor 112, which obtains instructions, or operation codes, (also known as opcodes), and data via a bus 114 from a main memory 116. The processor 112 could be any processor adapted to support the debugging methods, apparatus and article of manufacture of the invention. In particular, the computer processor 112 is selected to support monitoring of memory accesses according to user-issued commands. Illustratively, the processor is a PowerPC available from International Business Machines of Armonk, N.Y.

The main memory 116 could be one or a combination of memory devices, including Random Access Memory, non-volatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device or on another computer coupled to the computer system 110 via bus 114.

The main memory 116 generally includes an operating system 118 and a programming environment 122. The programming environment 122 comprises a computer program 120 (to be debugged), a debugger program 123, debug data 150 and a monitored variables program 152. In one embodiment, the debug data 150 may include a breakpoint list 150A, a propagation list 150B, Control Flow Graph information 150C, and a killed variables storage area 150D. The programming environment 122 facilitates debugging the computer program 120, or computer code, by providing tools for locating, analyzing and correcting faults. One such tool is the debugger program 123 (also referred to herein as the debugger). In one embodiment, the debugger 123 is a VisualAge for C++ for OS/400 debugger modified according to the invention. VisualAge for C++ for OS/400 is available from International Business Machines of Armonk, N.Y.

Although the software constructs, such as the computer program 120 and the debugger 123, are shown residing on the same computer, a distributed environment is also contemplated. Thus, for example, the debugger 123, the debug data 150 and the monitored variables program 152 may be located on a networked device 146, while the computer program 120 to be debugged is on the computer system 110.

In a specific embodiment, the debugger 123 comprises a debugger user interface 124, expression evaluator 126, Dcode interpreter 128 (also referred to herein as the debug interpreter 128), debugger hook 134, a breakpoint manager 135 and a results buffer 136. Although treated herein as integral parts of the debugger 123, one or more of the foregoing components may exist separately in the computer system 110. Further, the debugger may include additional components not shown. Also, while the monitored variables program 152 is shown separately from the debugger 123, the program 152 may, in fact, be a component of the debugger 123.

A debugging process is initiated by the debug user interface 124. The user interface 124 presents the program under debugging and highlights the current line of the program on which a stop or error occurs. The user interface 124 allows the user to set control points (e.g., breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross referenced.

The expression evaluator 126 parses the debugger command passed from the user interface 124 and uses a data structure (e.g., a table) generated by a compiler to map the line number in the debugger command to the physical memory address in memory 116. In addition, the expression evaluator 126 generates a Dcode program for the command. The Dcode program is machine executable language that emulates the commands. Some embodiments of the invention include Dcodes which, when executed, activate control features described in more detail below.

The Dcode generated by the expression evaluator 126 is executed by the Dcode interpreter 128. The interpreter 128 handles expressions and Dcode instructions to perform various debugging steps. Results from Dcode interpreter 128 are returned to the user interface 124 through the expression evaluator 126. In addition, the Dcode interpreter 128 passes on information to the debug hook 134, which takes steps described below.

After the commands are entered, the user provides an input that resumes execution of the program 120. During execution, control is returned to the debugger 123 via the debug hook 134. The debug hook 134 is a code segment that returns control to the appropriate user interface. In some implementations, execution of the program eventually results in an event causing a trap to fire (e.g., a breakpoint is encountered). Control is then returned to the debugger by the debug hook 134 and program execution is halted. The debug hook 134 then invokes the debug user interface 124 and may pass the results to the user interface 124. Alternatively, the results may be passed to the results buffer 136 to cache data for the user interface 124. In other embodiments, the user may input a command while the program is stopped, causing the debugger to run a desired debugging routine. Result values are then provided to the user via the user interface 124.

Figure 2:
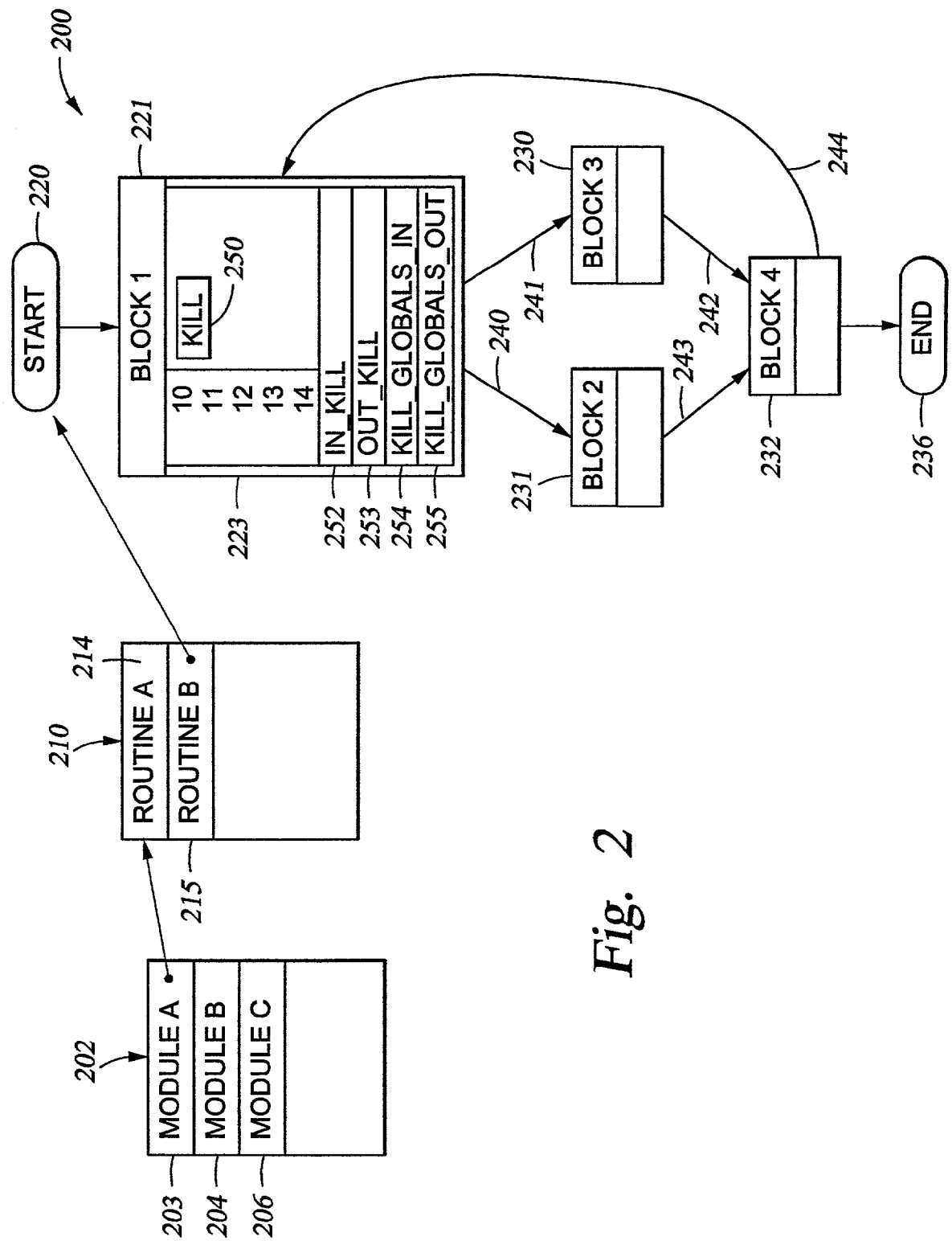
FIG. 2 is a diagram of a Control Flow Graph.

In some embodiments, the debugger 123 utilizes a Control Flow Graph (CFG) to advantage. In particular, the CFG is used to locate variables which may be changed by continued execution of the program from a present location at which execution was halted. In general, the CFG contains blocks, or nodes, of executable computer program statements. The blocks are constructed during the compilation of computer program 120 by a compiler (not shown) known in the art. One illustration of a CFG 200 within program 120 is shown in FIG. 2, which is now described. Those skilled in the art will appreciate that even though FIG. 2 is described in terms of statically compiled and bound languages, these concepts can also be applied to dynamically bound languages such as Java without deviating from this invention. Additional information regarding compilers and related data structures may be found in Compilers: *Principles, Techniques, and Tools;* Alfred V. Aho, Ravi Sethi, Jeffery D. Ullman; Addison-Wesley Publishing Company 1986.

Referring now to FIG. 2, a CFG 200 and related information is anchored by (pointed to or referenced by) a module list 202. As known in the art, each module is a separate compilation unit. These units start out in a form commonly known as a source file. Source files can be written in one of many computer languages, such as but not limited to, C, C++, or Ada. These source files are then converted to object by a program called a compiler. The compiler processes the source file through a process known in the art as compilation and produces output commonly known as an object file. The object files are then linked together to produce program 120. The compiler also constructs the CFG 200 and kill sets associated with each statement of the compiled program 120. The CFG 200 and the kill sets are then used by the debugger 123 according to embodiments of the invention.

The module list 202 contains a plurality of one or more module records 203, 204, and 205. One record is provided for each object file or module used to build the program 120. Because each module can contain multiple routines (procedures or methods), each module record refers to a routine list 210. The routine list 210 contains a plurality of records, one for each routine in the module. Each record 214, through 215 in the routine list contains the name of the routine, and a reference to the CFG 200 constructed for that routine.

CFG 200 comprises a start node 220, an end node 236, and intermediary nodes 221, 230, 231, and 232, which are known in the art as basic blocks. A basic block is a sequence of consecutive statements in which flow of control enters at the beginning and leaves at the end without halt or the possibility of branching except at the end. Call statements do not break a basic block and may be contained within a basic block. These basic blocks are linked by arcs 240, 241, 242, 243, and 244, which specify possible program control flow between the blocks.

Block 221 is representative of the structure of all the basic block nodes within CFG 200. Basic Block 221 contains a list of statements 223 that are the statements within program 120, module 203, and routine 215, that reside in block 221. List 223 contains statements 10, 11, 12, 13, 14.

Each statement in the statement list 223 has an associated local kill set 250 (referred to herein as the kill set 250). For simplicity, only statement 10 is shown having an associated kill set 250. The kill set 250 contains the variables which may be modified by executing the statement with which the kill set 250 is associated (e.g., statement 10 in the case of the kill set 250 shown). Thus, the kill set 250 indicates an executable status of variables with respect to a particular statement.

As illustrated by block 221, all blocks in the CFG 200 include an In_Kill set 252 and an Out_Kill set 253. The In_Kill set 252 represents killed variables on entry to a particular block. The Out_Kill set 253 represents killed variables on exit from a particular block. Both sets are initially empty and are populated with information during a data flow analysis described below.

In one embodiment, each of the kill sets 250, 252, 253 is implemented as bit vectors. Thus, in the case of the local kill set 250, one bit vector is provided for each statement with one bit per variable where a bit in the bit vector is set when the value of the associated variable may be changed by subsequent continued execution of program 120. In the case of the In_Kill set 252 and the Out_Kill set 253, one bit vector is provided for each block with one bit per variable where a bit in the bit vector is set when the value of the associated variable is lost.

As represented by block 221, each block in the CFG 200 is configured with a Kill_Globals_In flag 254 and a Kill_Globals_Out flag 255. In one embodiment, the flags 254, 255 are configured as flags having two states, ON and OFF. When the flags are set to ON, the Kill_Globals_In flag 254 and the Kill_Globals_Out flag 255 allow all global variables to be designated as killed. This is particularly advantageous where a call is made to a routine from a particular block. In such cases, it is not known which global variables may be changed. Accordingly, all global variables are simply flagged as killed.

Utilizing the information provided by the CFG 200, the debugger program 123 can locate a statement on which execution has been halted (e.g., due to a breakpoint). The debugger 123 can then determine the executable statuses for variables associated with subsequent statements (including the one on which execution has been halted (i.e., the current statement)) that may be encountered before encountering a next breakpoint. That is, a determination can be made as to whether a variable's value may change during continued execution of the program 120 from a present stopped location. This determination may be made with reference to the variable sets/flags 250, 252, 253, 254 and 255. Only those variables whose values may change are updated in the variables window display to a user.

Figure 3:
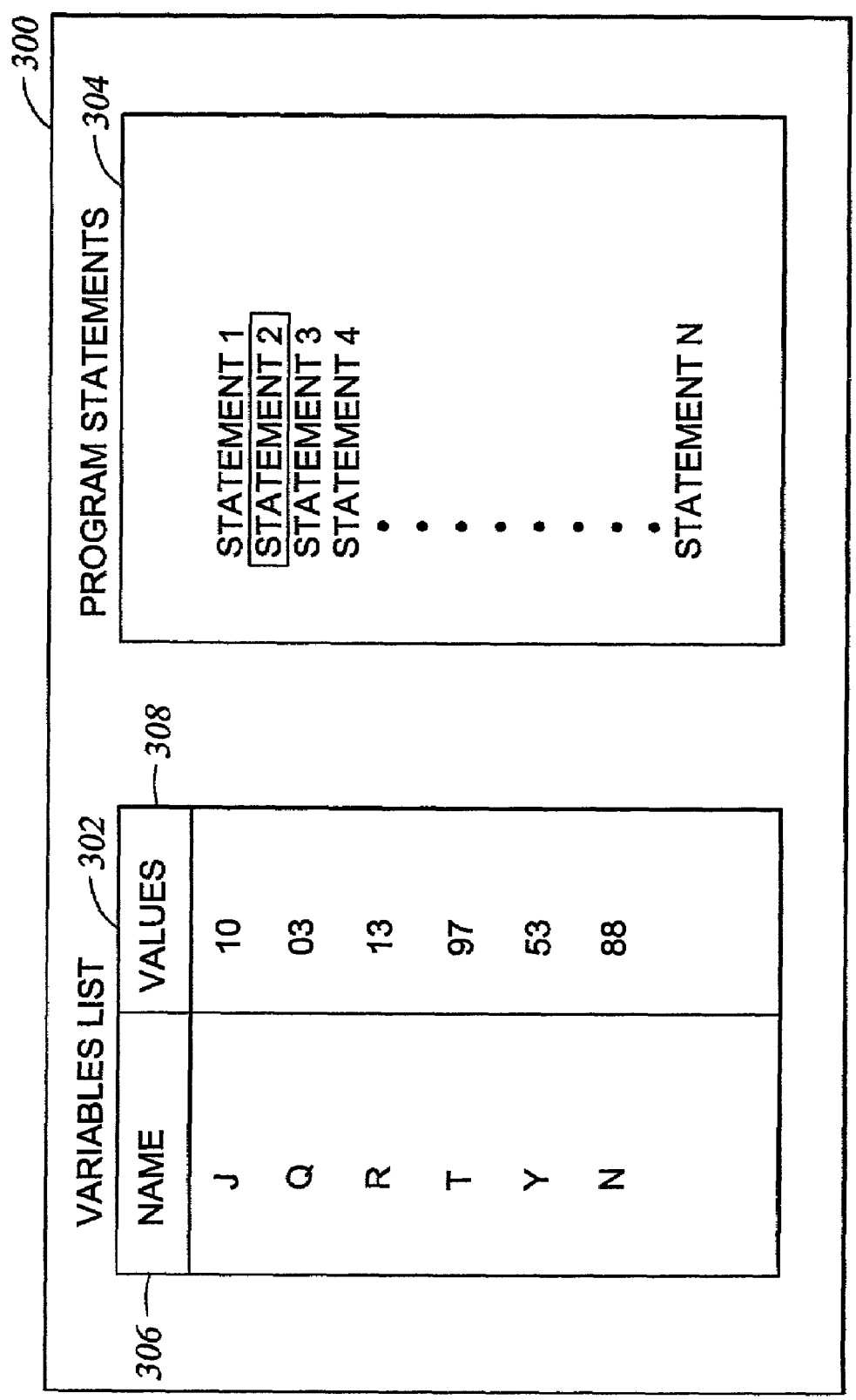
FIG. 3 is a user interface configured with a variables window.

Embodiments of displaying the variables are illustrated with reference to FIG. 3. FIG. 3 shows an illustrative variables window 300, which may be displayed on the display 142. The window 300 is configured to contain variables of the program 120. The variables displayed may be user-defined variables or may be special classes of variables, such as local variables. In any case, such variables are referred to herein as the monitored variables. Illustratively, the window 300 comprises a variables list 302 and a program statements list 304. The variables list 302 may contain monitored variables selected by the user, all local variables or any other variables. Illustratively, the variables list 302 includes a "Name" column 306 and a "Value" column 308. The "Name" column 306 holds the names of variables, and a "Value" column 308 holds each variable's value. The program statements list 304 displays the program statements of a program being debugged (e.g., program 120). Typically, when the program stops executing, the next statement to be executed in the program is displayed in a manner that highlights the statement. Illustratively, "statement 2" is highlighted, indicating that execution has stopped at that statement. Accordingly, the variables list 302 contains the variables and their respective values. In accordance with embodiments of the present invention, only those values whose values were determined to possibly change are updated when the window 300 is refreshed.

Figure 4:
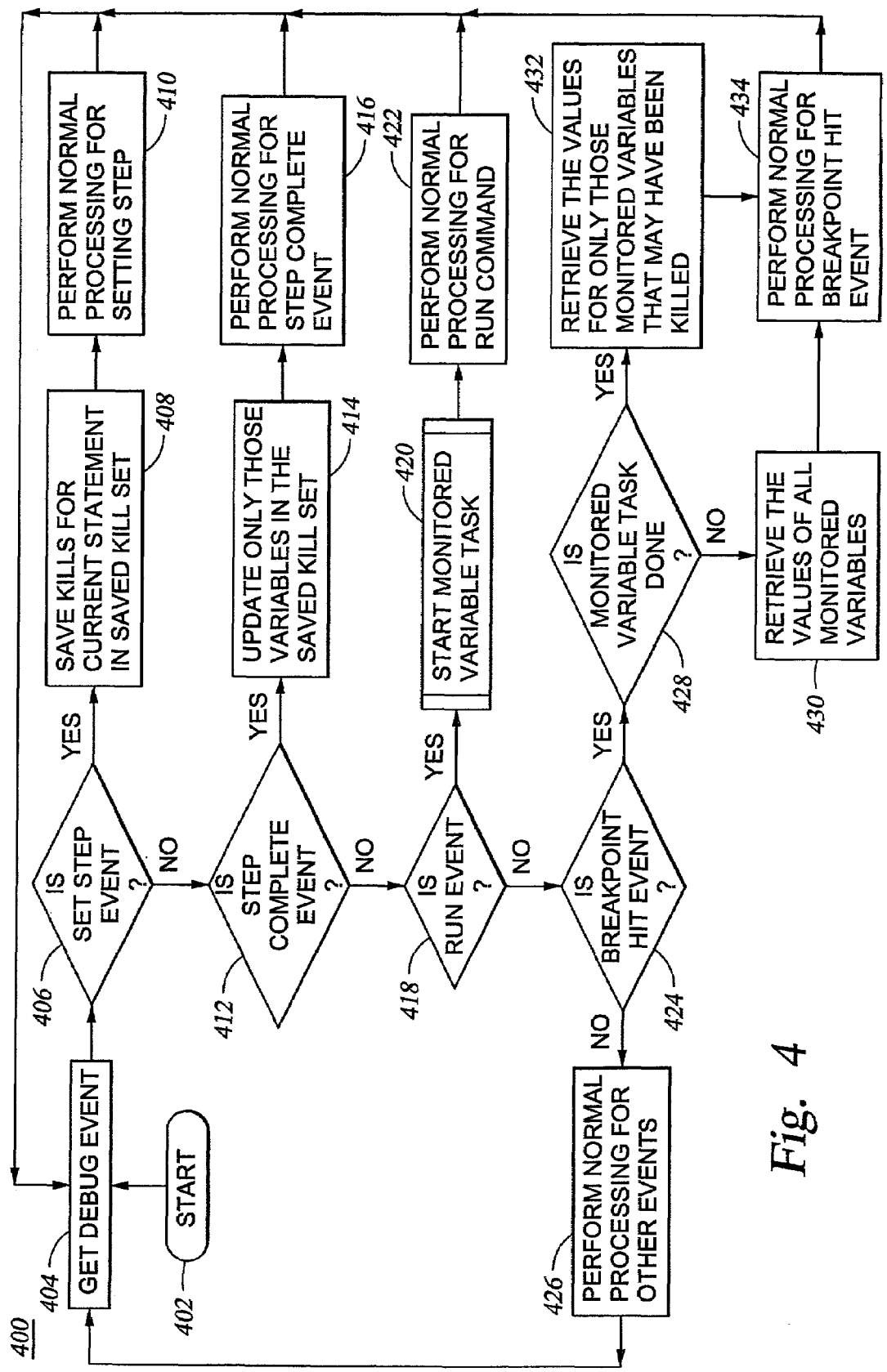
FIG. 4 is a flowchart illustrating the operation of a debugging program.

FIG. 4 shows a method 400 for handling debugger events by the debugger 123. The method 400 is entered at step 402 and proceeds to step 404 where a debug event is received for handling. At step 406, the method 400 queries whether the event is to set a step operation. If so, at step 408, the kills of the current statement (i.e. the variables which may be changed by executing the current statement) are saved in the kill variables storage area 150D of the memory 116. The kills of the current statement are contained in the kill set 250 for the statement. The processing for setting the step is then performed at step 410 and the method 400 returns to step 404.

If step 406 is answered negatively, the method 400 proceeds to step 412 to query whether the event is the completion of a step operation. If so, only those variables in the saved kill set (from step 408) are updated, i.e., refreshed in the variables window displayed to the user at step 414. Normal processing for completing the step operation is performed at step 416, after which the method 400 returns to step 404.

If step 412 is answered negatively, the method 400 queries, at step 418, whether the event is a run event initiating execution of the program 120. If so, a monitored variables task (implemented by the monitored variables program 152) is initiated at step 420. One embodiment of a monitored variables task is described below with reference to FIG. 5. The run command is then processed in a conventional manner at step 422, after which the method 400 returns to step 404. It should be noted that the monitored variables task may be initiated even before a run command is received. However, if control points (e.g., breakpoints) are added subsequent to initiating the monitored variables task, the task must be restarted.

If step 418 is answered negatively, the method 400 proceeds to step 424 and queries whether the event is to handle an encountered breakpoint. Breakpoints which may be encountered include user-set breakpoints or breakpoints generated to implement a debug function, such as a "run to cursor" operation. If not, processing proceeds to step 426 where the event is handled according to predefined rules. Otherwise, the method 400 proceeds to step 428 to query whether the monitored variables task is finished. If the task is not finished, all values for all monitored variables are retrieved at step 430 and the task may be terminated. Alternatively, the user may elect to allow the task to finish. Such election would preferably be done prior to initiating a debugging session. However, the election may also be made once it is determined that the monitored variables task is not completed at step 428. In any event, the breakpoint is processed in a conventional manner at step 434, after which the method 400 returns to step 404.

If the task has finished at step 428, the method 400 proceeds to step 432 to retrieve the values for only those monitored variables that may have been changed (i.e., killed) as determined by the task. In one embodiment, the values to be retrieved are contained in the breakpoint list 150A. An illustrative breakpoint list 150A configured with a kill column to contain the variables to be retrieved is described below with reference to FIG. 5. The breakpoint is then processed in a conventional manner at step 434, after which the method 400 returns to step 404.

Figure 5:
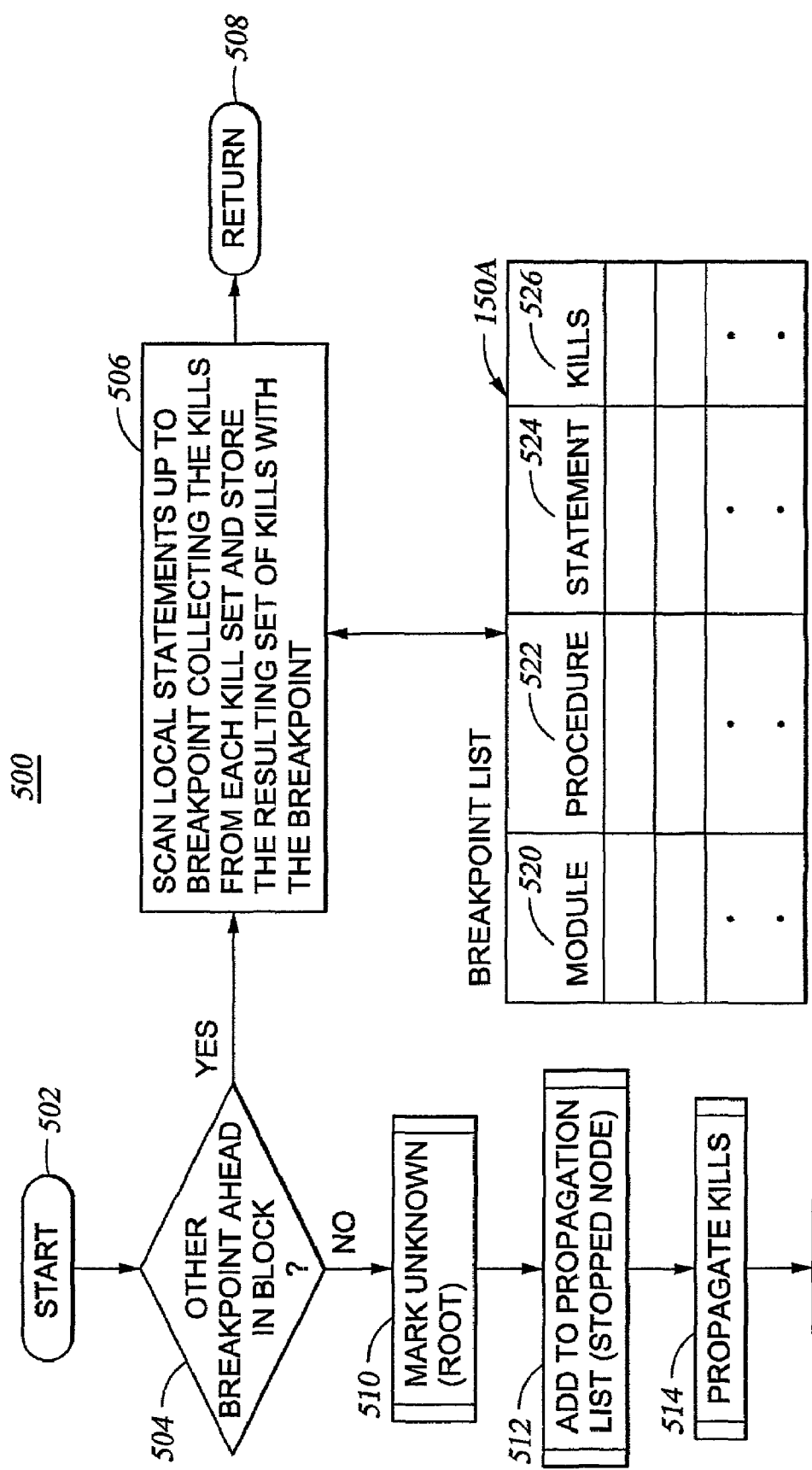
FIG. 5 is a flow chart illustrating a monitored variable task.

Referring now to FIG. 5, a method 500 is shown illustrating one embodiment of the monitored variables task implemented by the monitored variables program 152. The method 500 is entered at step 502 and proceeds to step 504. At step 504, the method 500 queries whether the present block of the CFG 200 contains another breakpoint at some location ahead of the current stopped position. If so, the kill variables from the kill set 250 from each of the statements up to the breakpoint are stored in the breakpoint list 150A in a record associated with the breakpoint, after which the method 500 returns at step 508. An illustrative breakpoint list 150A is shown in FIG. 5 as a table organized as a plurality of columns and rows. Each row of the breakpoint list 150A defines a record associating the location of a breakpoint with one or more killed variables. The location of a breakpoint may be defined by a module, a procedure (i.e., routine) and a statement. Accordingly, the breakpoint list 150A includes a module column 520, a procedure column 522 and a statement column 524. The killed variables for each breakpoint are contained in entries under the kills column 526.

If step 504 is answered negatively, the method 500 proceeds to step 510 where a Mark_Unknown routine is implemented. The Mark_Unknown routine is provided because it is recognized that it is possible to exit and then re-enter a given routine. When this happens, it is not known whether a given variable's value has changed. Accordingly, the Mark_Unknown routine determines each node which may be reached upon reentering a particular routine (i.e. the routine on which execution has stopped) and then marks all variables of the node as killed. A particular embodiment of the Mark_Unknown routine is described below with reference to FIG. 6. The method 500 then proceeds to step 512.

At step 512, an Add_To_Propagation_List routine is implemented. This method operates to traverse the CFG 200 to locate all nodes which may be reached from the current node at which execution has stopped. The traversal continues until a breakpoint is reached. Further traversal is not needed because execution cannot continue past a breakpoint. Any nodes identified by the Add_To_Propagation_List routine are added to the propagation list 150B. In this manner, the Add_To_Propagation_List routine defines those nodes that are subject to the Propagate_Kills dataflow analysis routine performed at step 514. In general, the Propagate_Kills dataflow analysis routine of step 514 propagates the kills to all the nodes in the propagation list 150B. In this way, it can be determined which kills can reach a particular breakpoint. These kills can then be added to the breakpoint list 150A for the particular breakpoint to which they propagated. The kills contained in the breakpoint list 150A are the only variables which must be updated when execution of the program 120 is again halted. Following the analysis at step 514, the method 500 returns at step 508. Particular embodiments of the Add_To_Propagation_List routine and the Propagate_Kills dataflow analysis routine are described below with reference to FIGS. 7 and 8, respectively.

Figure 6:
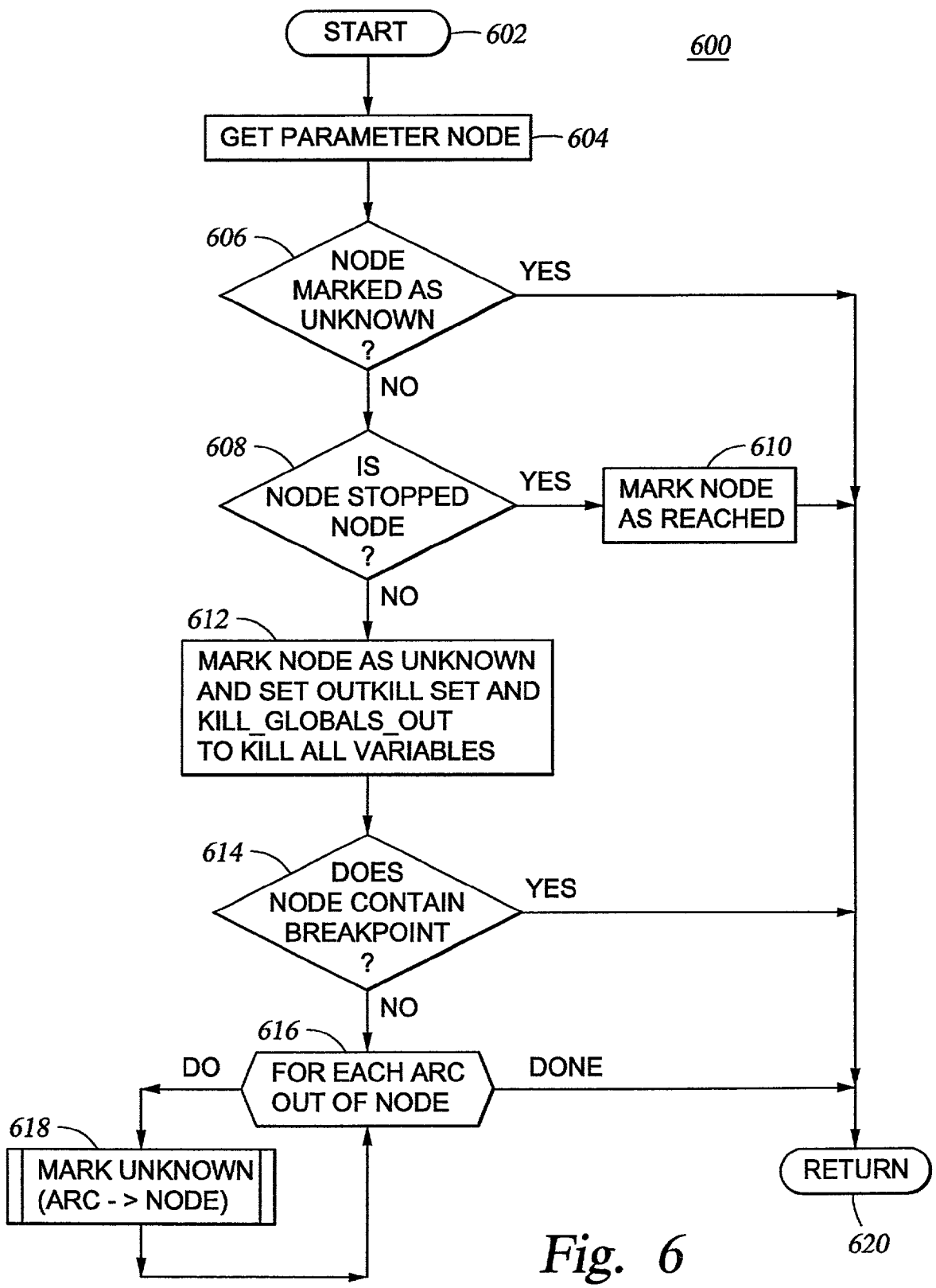
FIG. 6 is a flowchart illustrating a Mark_Unknown routine for identifying nodes which may be reentered after being exited.

FIG. 6 shows an illustrative Mark_Unknown routine 600 performed at step 510 of method 500. The routine 600 is entered at step 602 and then proceeds to step 604 where a parameter indicating a particular node is received. Initially, the parameter indicates the root node of the CFG 200. At step 606, a determination is made as to whether the node being processed is already marked as unknown. If so, the routine 600 returns at step 620. Otherwise, the routine proceeds to step 608 where it is determined whether the node being processed is the current stopped node. If so, the node is marked as "reached" and then the routine 600 returns at step 620. If step 608 is answered negatively, the method 600 proceeds to step 612 where the node being processed is marked as unknown and the Out_Kill set 253 for the node is configured to kill all variables and the Kill_Globals_Out Flag 255 is turned ON. Alternatively, at step 612, the kill set 250 associated with any breakpoint associated with the current node being processed is configured to kill all variables. Regardless of the particular embodiment, step 612 is implemented to kill all variables because no knowledge can be had about the current state of the variables. This is due to the fact that the CFG 200 may have been exited and reentered. At step 614, the routine 600 queries whether the node currently being processed contains a breakpoint. If so, the routine 600 returns at step 620. This is because execution will not continue past a breakpoint and, therefore, the analysis performed by the monitored variables program 152 need not continue past this point. If the node does not contain a breakpoint, processing proceeds to step 616 where a loop is entered for each arc out of the present node. Specifically, processing proceeds to step 618 where the Mark_Unknown routine is recursively performed for each node to which control passes as indicated by each arc. Once all arcs have been processed, the routine returns at step 620.

Figure 7:
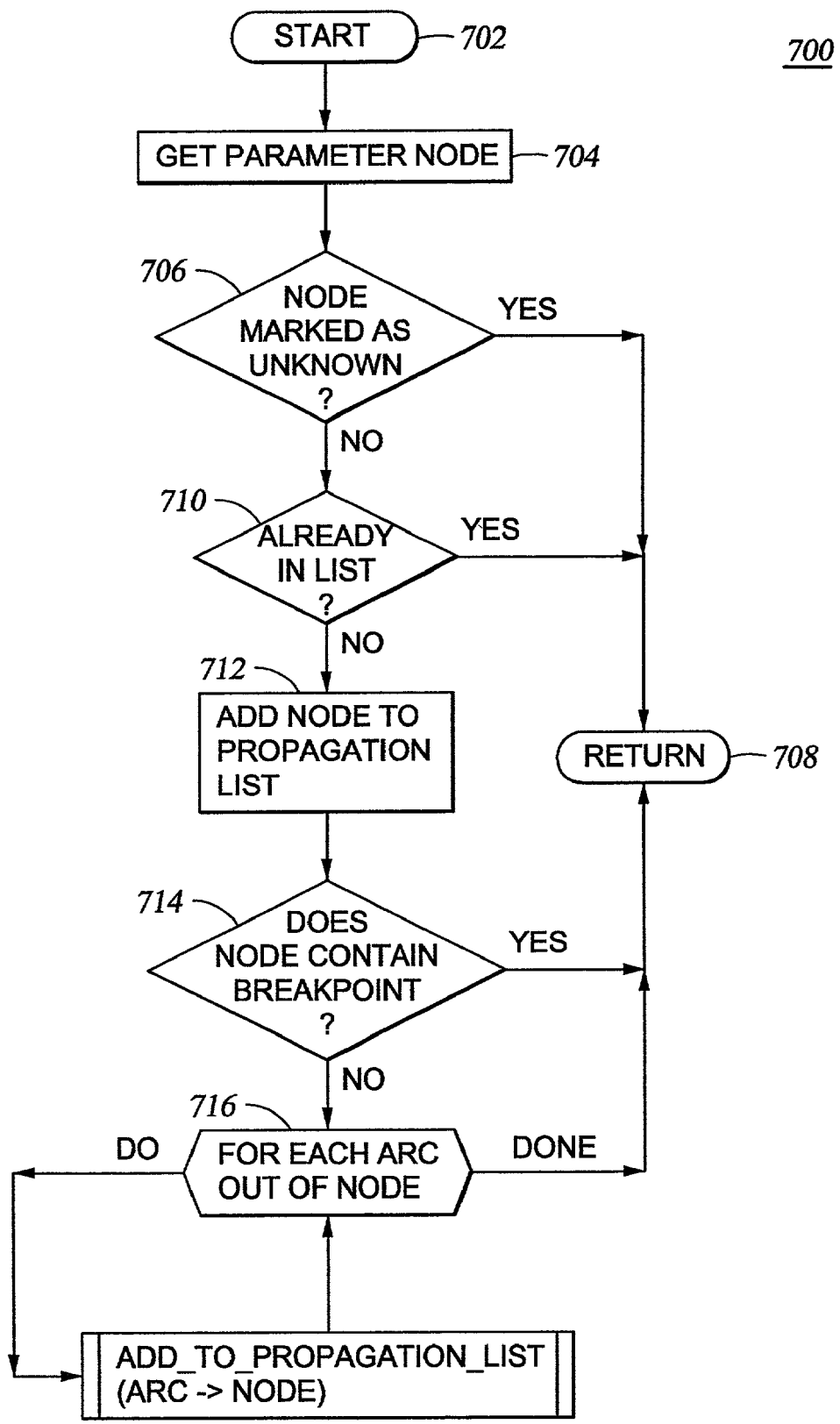
FIG. 7 is a flowchart illustrating an Add_to_Propagation_List routine for adding nodes to a propagation list.

FIG. 7 illustrates an Add_to_Propagation List routine 700 performed at step 512 of method 500. The routine 700 enters at step 702 and then proceeds to step 704 where a passed-in parameter node is received. For the first iteration of the routine 700, the parameter is for the currently stopped node, i.e., the node on which processing was last halted and from which processing was resumed. At step 706, the routine 700 queries whether the node being processed is marked as unknown. If so, the routine 700 returns at step 708. Otherwise, processing continues to step 710 where the routine 700 queries whether the node is already indicated in the propagation list 150B. If so, the routine 700 returns at step 708. Otherwise, the node is added to the propagation list 150B at step 712. From step 712, processing proceeds to step 714 to determine whether the node added to the propagation list 150B contains a breakpoint. It should be noted that in the case of the currently stopped node, only the remaining executable portion of the node is of interest. If the node (or the remaining portion of the node, in the case of the currently stopped node) does contain a breakpoint, further processing is not necessary because execution will not continue past the breakpoint. Accordingly, where a breakpoint is present, the routine 700 proceeds from step 714 to return at step 708. If, however, no breakpoint is present in the node, a loop is entered at step 716 for each arc out of the node. Specifically, the Add_to_Propagation_List routine is entered recursively for each arc, where the parameter passed into the routine is the node to which program control flows via the arc. In this manner, the CFG 200 is traversed until encountering a node marked as unknown or a node already in the propagation list 150B. Once all arcs have been processed, the routine 700 returns at step 708.

Figure 9:
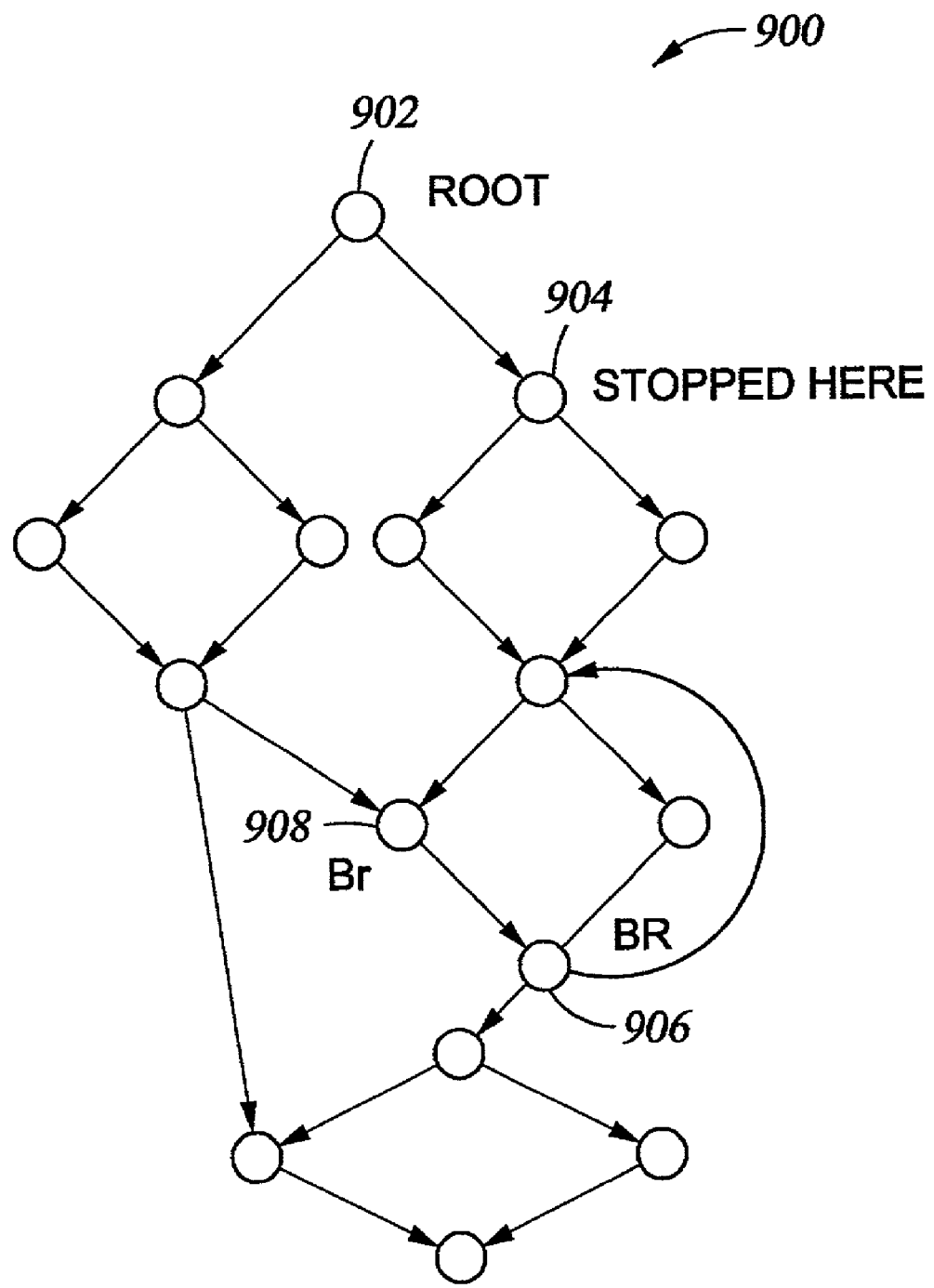
FIG. 9 is an illustrative control flow graph.
Figure 11:
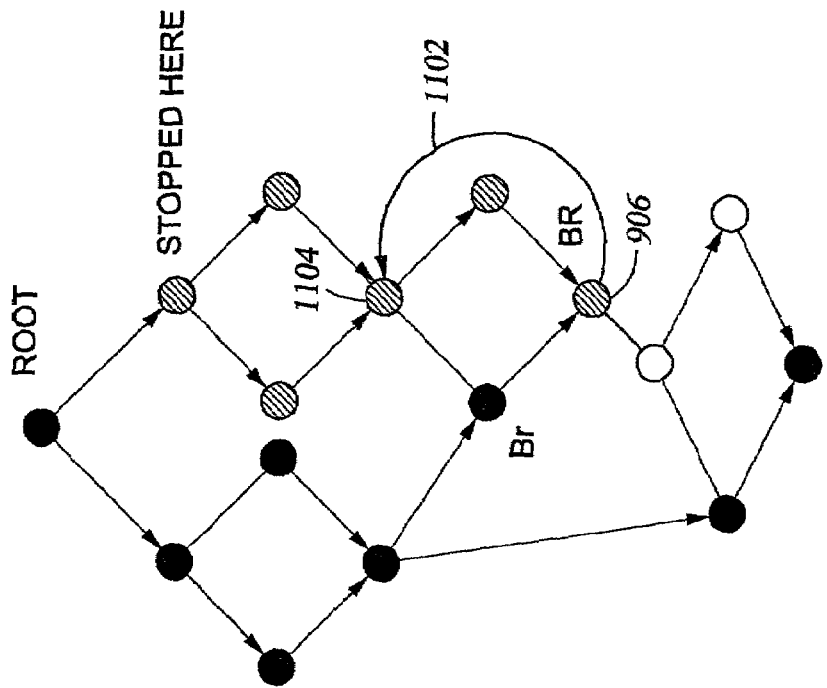
FIG. 11 is the control flow graph of FIG. 10 indicating which nodes have been added to the propagation list.
Figure 10:
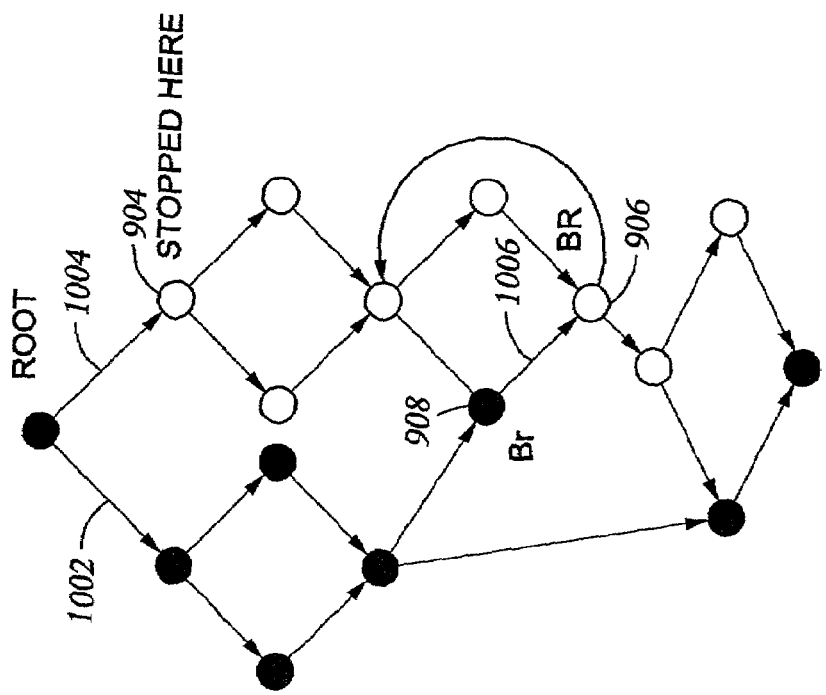
FIG. 10 is the control flow graph of FIG. 9 indicating which nodes have been marked as unknown.

The processing implemented by routines 600 and 700 may be briefly illustrated with reference to FIGS. 9-11, each representing a state of a control flow graph 900 at various points of processing the routine 600 and 700. The control flow graph 900 may be understood to be representative of the CFG 200. Referring first to FIG. 9, an initial state of the CFG 900 is shown. The CFG 900 comprises a root node 902, a currently stopped node 904 and a pair of breakpoint nodes 906, 908 (i.e., nodes containing breakpoint). In FIG. 10, a plurality of blacked out nodes is shown. These blacked out nodes indicate nodes which were marked as unknown at step 612 of the routine 600. The processing implemented by routine 600 caused traversal of the CFG 900 to a plurality of nodes via arc 1002. Processing along arc 1004 did not continue past the currently stopped node 904 because the query at step 608 of the routine 600 was answered affirmatively. Likewise, processing along arc 1006 did not continue past the breakpoint node 906 because the query at step 614 was answered affirmatively. FIG. 11 shows the state of the CFG 900 after implementing routine 700. The grayed out nodes indicates those nodes which have been added to the propagation list 150B. In this case, processing began at the currently stopped node 904 and then terminated at the breakpoint node 906 as a result of the query handled at step 714 of the routine 700. Further, for purposes of illustration, the CFG 900 is shown configured with an arc 1102 which would cause processing to proceed from the breakpoint node 906 to a preceding node 1104. In such an event, step 710 of routine 700 is answered affirmatively and processing returns at step 708.

Figure 8A:
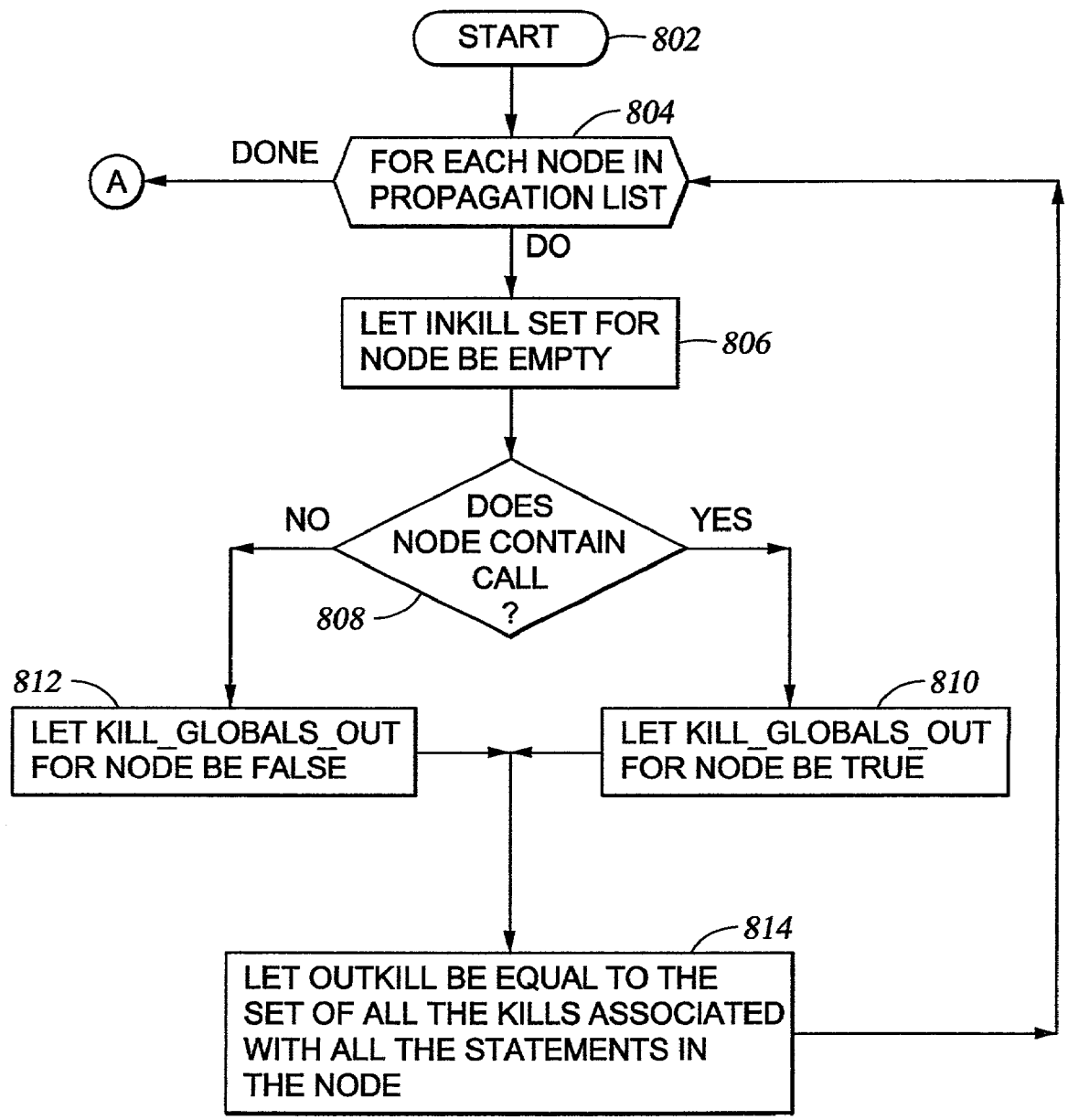
FIG. 8 is a flowchart illustrating the propagation of killed variables.
Figure 8B:
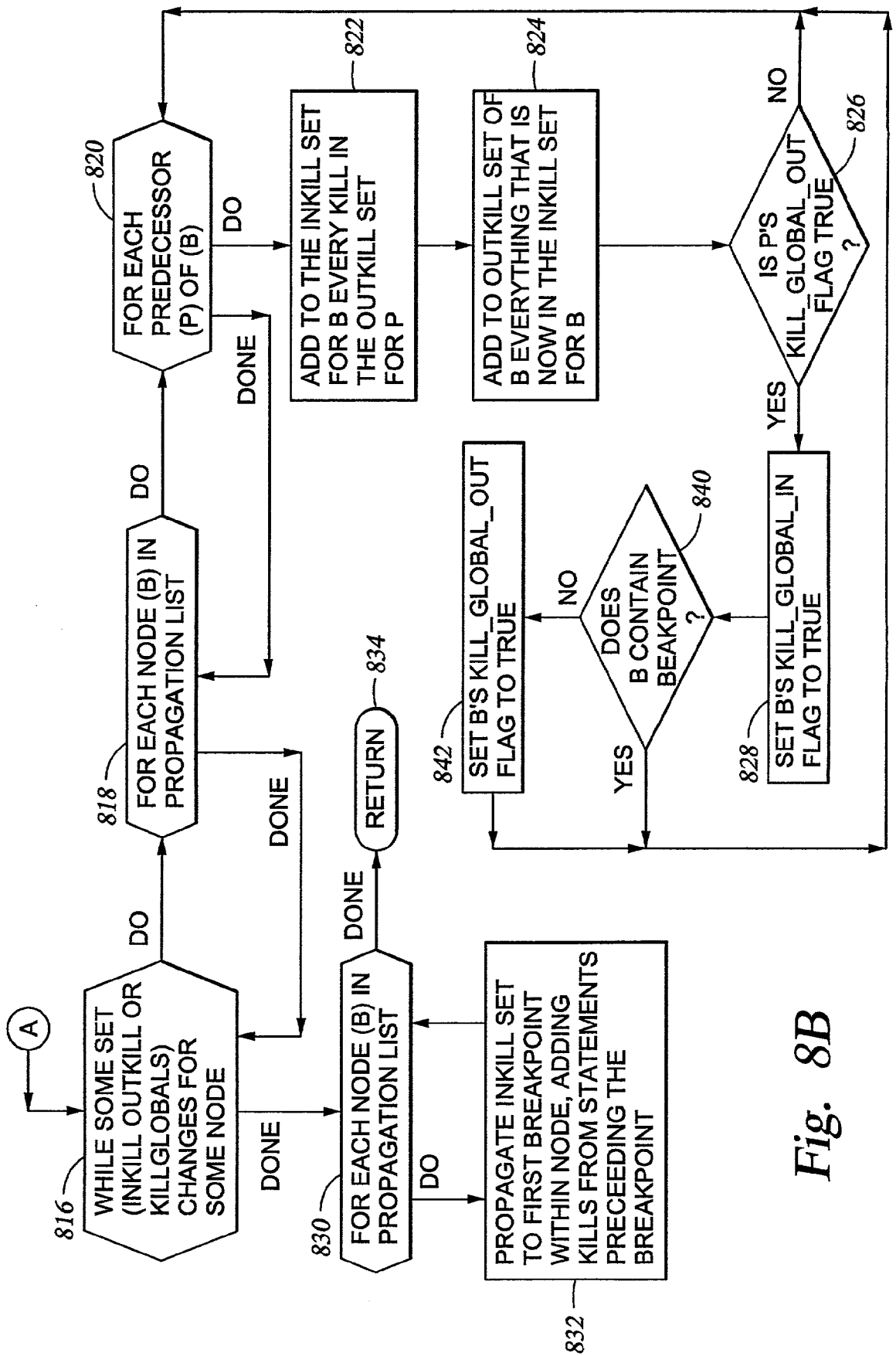

Referring now to FIG. 8, a Propagate_Kills routine 800 is shown. The routine 800, implemented at step 514 of the method 500 described above with reference to FIG. 5, begins at step 802 and then enters a loop at step 804. The loop is performed for each node indicated in the propagation list 150B. At step 806, the In_Kill set 252 for the node being processed is cleared, i.e., initialized. At step 808, the routine 800 queries whether the node contains a call. If so, the Kill_Globals_Out flag 255 is turned ON, or set to TRUE. If step 808 is answered negatively, the Kill_Globals_Out flag 255 is turned OFF, or set to FALSE. Processing then continues to step 814 where the Out_Kill set 253 is configured to kill all variables associated with all the statements in the current node (i.e., all the variables indicated in the kill set 250 of each of the statements of the node). The routine 800 then returns to step 804 to begin processing the next node in the propagation list 150B.

Once all nodes in the propagation list 150B have been processed, the routine 800 enters a loop at step 816 which is repeated so long as some kill set (i.e., In_Kill set 252, Out_Kill set 253, Kill_Globals_In flag 254, and Kill_Globals_Out flag 255) is changed for some node. The loop entered at step 816 itself comprises a pair of sub-loops. A first sub-loop is entered at step 818 for each node in the propagation list 150B. A second sub-loop is entered at step 820 for each predecessor node (in the CFG 200) of the node being processed by the loop entered at step 818. At step 822, the kills contained in the Out_Kill set 253 of the predecessor node are added to the In_Kill set 252 of the node being processed. That is, the kills of the predecessor node are propagated to the node being processed. At step 824, the kills of the In_Kill set 252 of the node being processed are added to the Out_Kill set 253 of the node being processed. By repeating these steps for each node in the propagation list 150B, the kills may be propagated through the CFG 200, 900. At step 826, the routine 800 queries whether the predecessor node's Kill_Globals_Out flag 255 is set to ON/TRUE. If step 826 is answered negatively, the routine 800 returns to step 820 to begin processing the next predecessor node. If step 826 is answered affirmatively, this state is propagated to the node being processed by setting the Kill_Globals_In flag 254 of the node to ON/TRUE at step 828.

From step 828, processing proceeds to step 840 to determine whether the node being processed contains a breakpoint. If so, the routine 800 returns to step 820 to begin processing the next predecessor node. Otherwise, processing proceeds to step 842 where the Kill_Globals_Out flag 255 for the node being processed is set to ON/TRUE.

Once each of the loops 816, 818 and 820 are completed, processing continues to step 830 where another loop is entered for each node in the propagation list 150B. At step 832, the kills are propagated to the first breakpoint which may be encountered in the node being processed. That is, the kills are written to an entry associated with the breakpoint under the kills column 526 of the breakpoint list 150A. The propagated kills include the In_Kill set 252 for the node being processed as well as the kills from any statements of the node preceding the breakpoint. Once this propagation is performed for each node in the propagation list 150B, the routine 800 returns at step 834.

At this point, those variables whose values may have changed when a breakpoint is encountered have been determined and are indicated under the kills column 526 of the breakpoint list 150A. Accordingly, when a breakpoint is hit (step 424 of method 400), only the values of variables contained in the breakpoint list record for the breakpoint encountered need to be retrieved (at step 432).

While the foregoing is directed to embodiments of the present invention, other and further embodiments of the invention may be devised without departing from the basic scope thereof, and the scope thereof is determined by the claims that follow.

What is claimed is:

1. A computer-implemented method for debugging a program in a distributed debugging environment linking at least a first and second computing system over a communications network, comprising:

displaying, on a display interface of a debugger application executing on the first computing system, a value of one or more data variables of the program being debugged;

receiving a command to execute the program being debugged, wherein the program is executed by at least the second computing system;

in response to receiving the command, executing, by at least the second computing system, the program from a first execution point to a second execution point:

determining, based on the first and second execution points, which data variables are capable of being modified by the execution of the program, wherein the determining comprises:

(i) if a node of a control flow graph that contains the first execution point of the program contains a breakpoint positioned after the first execution point, marking all data variables referenced during the execution of each statement of the node from the first execution point to the breakpoint as variables capable of being modified by the program during the execution of the program from the first execution point to the breakpoint, and executing each statement of the node from the first execution point to the breakpoint;

(ii) otherwise, beginning with a root node, marking each node of the control flow graph from which flow of the program can be exited and reentered during execution of the program from the first execution point to the second execution point, for each marked node, marking all data variables of the node as variables capable of being modified by the program during the execution of the program from the first execution point to the second execution point, and beginning with the node containing the first execution point, generating a list of unmarked nodes reachable during execution of the program from the first execution point; and refreshing the value displayed on the display interface of the debugger application executing on the first computing system, only for the data variables marked as capable of being modified by the execution of the program from the first execution point to the second execution point.

2. The method of claim 1, wherein the command comprises a step command configured to cause the execution of a statement of the program being debugged present at the first execution point.

3. The method of claim 2, wherein executing the program to the second execution point, comprises:
executing the statement; and
determining a set of variables modified by the execution of the statement.

4. The method of claim 1, wherein the command comprises a run command, and wherein the second execution point comprises a breakpoint encountered by the execution of the program from the first execution point.

5. The method of claim 1, wherein generating the list comprises:
traversing the control flow graph from the node containing the first execution point of the program to each subsequent node by following program control flow defined by arcs;
adding each encountered node to the list if the encountered node is not marked and is not already in the list;
determining whether the encountered node contains a breakpoint; and
if so, terminating a traversal along a current traversal path.

6. The method of claim 1, further comprising:
propagating, to each unmarked node in the list, a propagated kill set from a preceding unmarked node in the control flow graph, wherein the propagated kill set contains a sum of all data variables associated with all statements of the preceding unmarked node and all propagated kill variables propagated to the preceding unmarked node.

7. The method of claim 1, wherein the debugger interface is displayed on a first computer system, and wherein the program being debugged is executing on a second computer system, and wherein the first and second computer systems are configured to communicate over a network communication channel.

8. A computer-readable storage medium containing a program which, when executed, performs an operation for debugging in a distributed debugging environment linking at least a first and second computing system over a communications network, comprising:

displaying, on a display interface of a debugger application executing on the first computing system, a value of one or more data variables of the program being debugged;

receiving a command to execute the program being debugged, wherein the program is executed by at least the second computing system;

in response to receiving the command, executing, by at least the second computing system, the program from a first execution point to a second execution point:

determining, based on the first and second execution points, which data variables are capable of being by the execution of the program, wherein the determining comprises:

(i) if a node of a control flow graph that contains the first execution point of the program contains a breakpoint positioned after the first execution point, marking all data variables referenced during the execution of each statement of the node from the first execution point to the breakpoint as variables capable of being modified by the program during the execution of the program from the first execution point to the breakpoint, and executing each statement of the node from the first execution point to the breakpoint;

(ii) otherwise, beginning with a root node, marking each node of the control flow graph from which flow of the program can be exited and reentered during execution of the program from the first execution point to the second execution point, for each marked node, marking all data variables of the node as variables capable of being modified by the program during the execution of the program from the first execution point to the second execution point, and beginning with the node containing the first execution point, generating a list of unmarked nodes reachable during execution of the program from the first execution point; and refreshing the value displayed on the display interface of the debugger application executing on the first computing system, only for the data variables marked as capable of being modified by the execution of the program from the first execution point to the second execution point.

9. The computer-readable storage medium of claim 8, wherein the command comprises a step command configured to cause the execution of a code statement of the program being debugged present at the first execution point.

10. The computer-readable storage medium of claim 9, wherein executing the program being debugged to the second execution point, comprises:
executing the statement; and
determining a set of variables modified by the execution of the statement.

11. The computer-readable storage medium of claim 8, wherein the command comprises a run command, and wherein the second execution point comprises a breakpoint encountered by the execution of the program from the first execution point.

12. The computer-readable storage medium of claim 8, wherein generating the list comprises:
traversing the control flow graph from the node containing the first execution point of the program to each subsequent node by following program control flow defined by arcs;

adding each encountered node to the list if the encountered node is not marked and is not already in the list;

determining whether the encountered node contains a breakpoint; and if so, terminating a traversal along a current traversal path.

13. The computer-readable storage medium of claim 8, wherein the operation further comprises:

propagating, to each unmarked node in the list, a propagated kill set from a preceding unmarked node in the control flow graph, wherein the propagated kill set contains a sum of all data variables associated with all statements of the preceding unmarked node and all propagated kill variables propagated to the preceding unmarked node.

14. The computer-readable storage medium of claim 8, wherein the debugger interface is displayed on a first computer system, and wherein the program being debugged is executing on a second computer system, and wherein the first and second computer systems are configured to communicate over a network communication channel.

15. A first computing device, comprising:

a processor;

a memory; and a debugger program which when executed on the processor, performs a method for debugging an application executing on a second computing device in a distributed debugging environment, comprising:

displaying, on a display interface of a debugger application executing on the first computing system, a value of one or more data variables of the program being debugged;

receiving a command to execute the program being debugged, wherein the program is executed by at least the second computing system;

in response to receiving the command, executing, by at least the second computing system, the program from a first execution point to a second execution point;

determining, based on the first and second execution points, which data variables are capable of being by the execution of the program, wherein the determining comprises:

(i) if a node of a control flow graph that contains the first execution point of the program contains a breakpoint positioned after the first execution point, marking all data variables referenced during the execution of each statement of the node from the first execution point to the breakpoint as variables capable of being modified by the program during the execution of the program from the first execution point to the breakpoint, and executing each statement of the node from the first execution point to the breakpoint;

(ii) otherwise, beginning with a root node, marking each node of the control flow graph from which flow of the program can be exited and reentered during execution of the program from the first execution point to the second execution point, for each marked node, marking all data variables of the node as variables capable of being modified by the program during the execution of the program from the first execution point to the second execution point, and beginning with the node containing the first execution point, generating a list of unmarked nodes reachable during execution of the program from the first execution point; and refreshing the value displayed on the display interface of the debugger application executing on the first computing system, only for the data variables marked as capable of being modified by the execution of the program from the first execution point to the second execution point.

16. The computing device of claim 15, wherein the command comprises a step command configured to cause the execution of a code statement of the program being debugged present at the first execution point.

17. The computing device of claim 16, wherein executing the program being debugged to the second execution point, comprises:

executing the statement; and determining a set of variables modified by the execution of the statement.

18. The computing device of claim 15, wherein the command comprises a run command, and wherein the second execution point comprises a breakpoint encountered by the execution of the program from the first execution point.

19. The computing device of claim 15, wherein generating the list comprises:

traversing the control flow graph from the node containing the first execution point of the program to each subsequent node by following program control flow defined by arcs;

adding each encountered node to the list if the encountered node is not marked and is not already in the list;

determining whether the encountered node contains a breakpoint; and if so, terminating a traversal along a current traversal path.

20. The computing devices of claim 15, wherein the operations for the program further comprise:

propagating, to each unmarked node in the list, a propagated kill set from a preceding unmarked node in the control flow graph, wherein the propagated kill set contains a sum of all data variables associated with all statements of the preceding unmarked node and all propagated kill variables propagated to the preceding unmarked node.

* * * * *